United States Patent [19]

Nagano

[11] Patent Number: 4,586,396
[45] Date of Patent: May 6, 1986

[54] SPEED CHANGE OPERATING DEVICE FOR A BICYCLE

[75] Inventor: Masashi Nagano, Izumi, Japan

[73] Assignee: Shimano Industrial Company Limited, Osaka, Japan

[21] Appl. No.: 627,629

[22] Filed: Jul. 3, 1984

[30] Foreign Application Priority Data

Jul. 6, 1983 [JP] Japan .............................. 58-105657[U]

[51] Int. Cl.⁴ .......................... G05G 1/06; G05G 5/16
[52] U.S. Cl. .................................. 74/473 R; 74/475;
74/489; 74/491; 74/501 R; 74/531
[58] Field of Search .................... 74/473 R, 475, 489,
74/491, 531, 501 R; 474/81

[56] References Cited

U.S. PATENT DOCUMENTS

| 3,181,391 | 5/1965 | Juy | 74/531 |
| 3,426,614 | 2/1969 | Brilando et al. | 74/501 R |
| 4,046,025 | 9/1977 | Ozaki | 74/489 X |
| 4,155,270 | 5/1979 | Juy | 74/475 |
| 4,434,679 | 3/1984 | Shimano | 74/491 |
| 4,437,357 | 3/1984 | Ozaki et al. | 474/81 X |

FOREIGN PATENT DOCUMENTS 0053776 6/1982 European Pat. Off. .
3039024 4/1981 Fed. Rep. of Germany .

Primary Examiner—Allan D. Hermann
Attorney, Agent, or Firm—Stevens, Davis, Miller & Mosher

[57] ABSTRACT

A speed change operating device for a bicycle which includes first and second operating levers each having a boss and a control portion and supported rotatably at both sides of a base member. Between the opposite inside surfaces of the operating portions of the levers are provided enlarged portions projecting inwardly with respect to both lateral sides of the base member.

2 Claims, 4 Drawing Figures

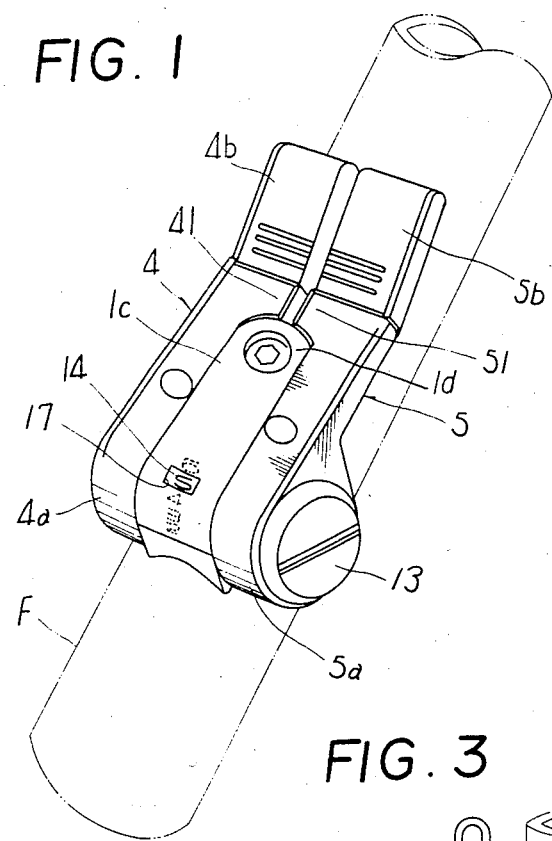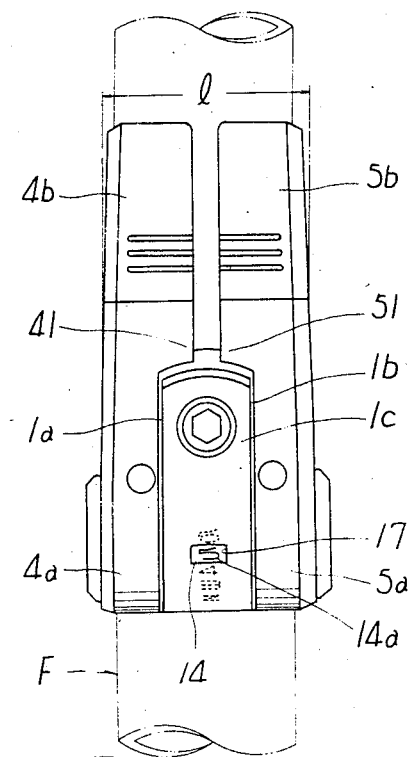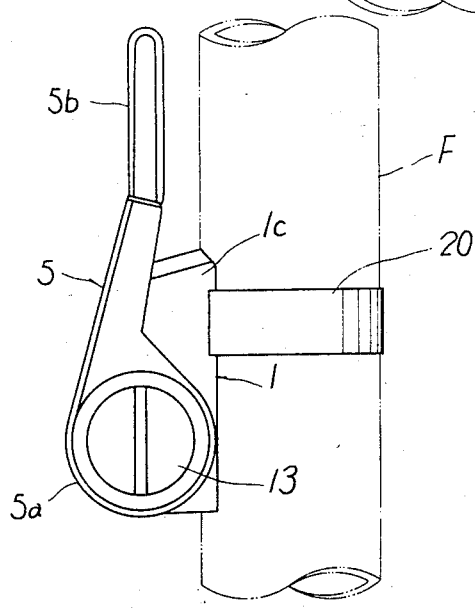

SPEED CHANGE OPERATING DEVICE FOR A BICYCLE

FIELD OF THE INVENTION

This invention relates to a speed change operating device for a bicycle, and more particularly to a speed change operating device for a bicycle provided with a base member fixed to the bicycle frame and first and second operating levers supported rotatably at both sides of the base member, the operating levers rotating to actuate a front derailleur and a rear derailleur for changing the bicycle speed.

BACKGROUND OF THE INVENTION

Conventionally, a speed change operating device for a bicycle has been well-known which uses front and rear derailleurs to switch a driving chain to a desired one of the multistage front chain gears or rear chain gears for changing the bicycle speed.

Also, the so-called twin lever type speed change operating device has hitherto been well-known which supports first and second operating levers rotatably to one base member through lever shafts to thereby operate the front and rear derailleurs.

Each operating lever generally has a control portion of relatively small width about equal to an axial length of a boss supported to a lever shaft. Therefore, a large space is developed between the control portions of both the lever so that a cyclist operates the first or second lever by independently gripping it by his hand.

Accordingly, his hand operating the lever is unstable, thereby creating the problem that short or excessive operation may cause deterioration of speed change efficiency. Also, the small-width levers may cuase pain in his finger.

A twin lever type speed change operating device has been proposed which has the lever control portions each of larger width than the axial length of the boss. Such device merely widens the utmost end of each control portion, but it is impossible to operate one lever by utilizing the other lever as a basis of operating the one lever. Hence, such twin lever type device, although the pain the cyclist's finger is obviated, is of no effect with respect to improvement in the stability and efficiency for speed change.

SUMMARY OF THE INVENTION

An object of the invention is to provide a speed change operating device with enlarged width of the control portion at the respective first and second levers without increasing the overall width of the speed change operating device, so that one lever can be operated stably by utilizing the other lever, thereby improving the stability and efficiency for lever operation.

In other words, this invention is characterized in that the first and second operating levers are provided in a space between the lever control portions with swollen portions formed between the opposite inside surfaces of the control portions. Hence, when the cyclist grips one of the first and second levers he can operate it stably by utilizing the swollen portion at the other lever. Also, the control portions are widened in their surface areas by use of the swollen portions without increasing the length of each lever projecting with respect to the bicycle frame.

The above and further objects and novel features of the invention will more fully appear from the following detailed description when the same is read in connection with the accompanying drawings.

BRIEF DESCRIPTION OF THE DRAWINGS

FIG. 1 is a perspective view of an embodiment of a speed change operating device of the invention, FIG. 2 is a front view thereof, FIG. 3 is a side view of the same.

DETAILED DESCRIPTION OF THE INVENTION

Figure 4:
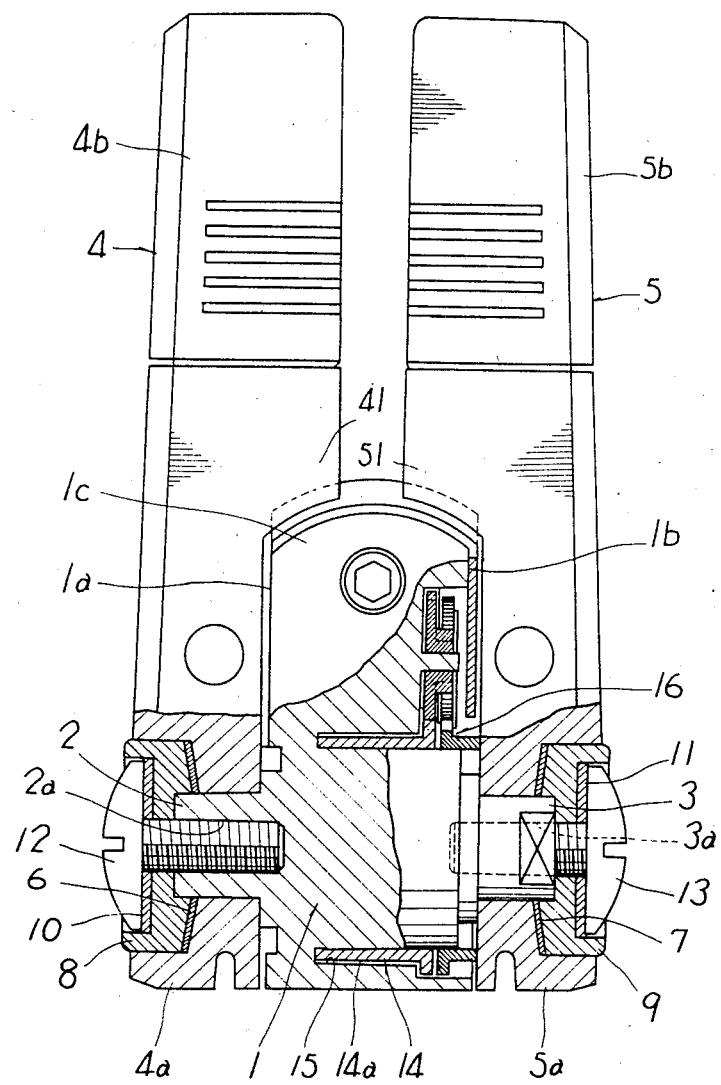
FIG. 4 is a partially cutaway enlarged front view of the same.

The speed change operating device shown in the drawings is to be mounted to a down tube F of the bicycle frame and basically comprises a base member 1 fixed to the frame F and first and second operating levers 4 and 5 supported rotatably to a pair of lever shafts 2 and 3 projecting from both sides 1a and 1b of base member 1.

The levers 4 and 5 comprise bosses 4a and 5a having shafts bores, and control portions 4b and 5b extending radially outwardly from the bosses 4a and 5a respectively, with the bosses 4a and 5a being supported rotatably to the lever shafts 2 and 3 respectively. Disc-like lids 8 and 9 having through bores are disposed at the outsides of bosses 4a and 5a through friction plates 6 and 7 respectively. Tightening screws 12 and 13 perforate the lids 8 and 9 through washers 10 and 11 and screw with threaded bores 2a and 3a provided at the centers of levers shafts 2 and 3, thereby applying to the operating levers 4 and 5 predetermined rotational resistances respectively, whereby the operating levers 4 and 5 are adapted to stop at predetermined speed change stages respectively. In addition, the base member 1 is fixed to the bicycle frame F by use of a fixing means, such as a band 20, wound around the same.

In the speed change operating device constructed as abovementioned, swollen or enlarged portions 41 and 51 swollen or projecting inwardly with respect to both sides 1a and 1b at the base member 1 are provided between the opposite inside surfaces of control portions 4b and 5b at the first and second operating levers 4 and 5.

The swollen portions 41 and 51 are provided at the control portions 4a and 5a from the lengthwise intermediate portions thereof of the utmost ends except for the roots or base portions. Alternatively, the swollen portions 41 and 51 may be provided at the lengthwise intermediate portions only. Also, the swollen portions 41 and 51 are shown as being level with the upper surfaces of control portions 4b and 5b, but may be stepped somewhat with respect thereto. In this case, it is preferable to give a slope to the stepped portion.

The speed change operating device constructed as abovementioned, as known, connects the first and second levers 4 and 5 through a pair of control wires with movable members having chain guides at the front and rear derailleurs. As a result the first and second operating levers 4 and 5 operate to pull the control wires against the return springs to thereby operate the chain guides, and the levers 4 and 5 operate to release the wires to move backwardly the chain guides by virtue of return springs, thus changing the bicycle speed.

Now, when the cyclist intends to operate the first operating lever 4, for example, he puts his forefinger on the lower surface of control portion 4b and his thumb on the upper surface of swollen portion 51 at the second operating lever 5 and operates the first operating lever 4 using the abutting portion of the thumb against the swollen portion 51 as the support point, thereby rotating the lever 4 around the lever shaft 2. In addition, the second lever 5 is operable the same as the first lever 4.

Such lever operation of putting the cyclist's thumb onto the swollen portion 51 is stable and makes control of the lever easy and accurate. The provision of swollen portions 41 and 52 enlarges the surface areas of control portions 4b and 5b, thereby obviating pain in the cyclist's finger caused by sandwiching with the lever. Also, since the swollen portions 41 and 51 are provided between the opposite inside surfaces of control portions 4b and 5b, a length 1 (in FIG. 2) between the widthwise outer surfaces at the control portions 4b and 5b is not increased. In addition, the base number 1 at the speed change operating device shown in the drawing is elongate along the bicycle frame F.

In other words, the base member 1 has an extension 1c from the body along the frame F, with an upper surface 1d of extension 1c being level with or substantially coplanar with each lever 4 or 5 at one speed change stage. Hence, when the cyclist intends to operate one lever 4 or 5, he can put his thumb on both the surfaces of swollen portion 51 or 41 and extension 1c, thereby enabling operation of the other lever. Thus, the thumb supporting area is further widened to improve further the controllability of the lever. Also, the base member 1 and first and second levers 4 and 5 are formed in an integrated manner, thereby giving a good appearance of slender feeling.

In the drawing, reference number 14 designates a rotary tubular display member which has display panel 14a at the outer periphery and which is rotatably inserted into an annular recess 15 provided at the base member 1. Reference numeral 16 designates an amplifier mechanism provided between the second lever 5 and the rotary display member 14 and adapted to amplify the rotation of display member 14 corresponding to that of second lever 5. Reference numeral 17 designates a window facing the display panel 14a.

As seen from the above, the speed change operating device of the invention is provided between the opposite inside surfaces of control portions at the first and second operating levers supported to the base member, with the swollen portions swollen inwardly with respect to both sides of the base member. When the cyclist intends to operate one of the first and second levers, he can put his thumb on the swollen portion at the other, thereby operating each lever stably to improve the controllability thereof.

Furthermore, the provision of a swollen portion can widen the surface area of each control portion, thereby removing or obviating pain in the cyclist's fingers, while the length between the widthwise outer surfaces of the control portions is not increased, thereby making the device compact as a whole.

While a preferred embodiment of the invention has been described using specific terms, such description is for illustrative purpose only, and it is to be understood that changes and variations may be made without departing from the spirit or scope of the following claims.

What is claimed is:

1. A speed change operating device for a bicycle including a base member fixed to a frame of the bicycle and first and second operating levers each supported rotatably to an opposing side of said base member; said base member comprising a body and a pair of lever shafts extending outwardly from opposite sides of said body, each operating lever having a boss supported rotatably to a said lever shaft and an operating portion extending radially outwardly from a said boss, each said operating portion having an enlarged portion projecting inwardly beyond a lateral side of said base member, said enlarged portions being positioned on opposing inside portions of said operating portions.

2. A speed change operating device for a bicycle according to claim 1, wherein said base member is elongate with respect to a longitudinal dimension of said frame, an upper surface of said base member being substantially coplanar with upper surfaces of said operating levers when each of said operating levers is in a predetermined speed change stage.

* * * * *